(12) United States Patent  
Simakis

(10) Patent No.: US 9,416,804 B2  
(45) Date of Patent: Aug. 16, 2016

(54) FLEXIBLE OBJECT HOLDER EMPLOYING THE USE OF A PLURALITY OF DIAPHRAGMS

(71) Applicant: Sam Simakis, Boulder, CO (US)

(72) Inventor: Sam Simakis, Boulder, CO (US)

( * ) Notice: Subject to any disclaimer, the term of this patent is extended or adjusted under 35 U.S.C. 154(b) by 22 days.

(21) Appl. No.: 14/290,801

(22) Filed: May 29, 2014

(65) Prior Publication Data

US 2015/0345525 A1    Dec. 3, 2015

Related U.S. Application Data

(60) Provisional application No. 61/829,600, filed on May 31, 2013.

(51) Int. Cl.
| | |
|---|---|
| *A47B 96/06* | (2006.01) |
| *F16B 2/22* | (2006.01) |
| *A01K 97/10* | (2006.01) |
| *A47K 10/34* | (2006.01) |
| *B65D 41/00* | (2006.01) |
| *A63C 11/02* | (2006.01) |

(52) U.S. Cl.
CPC . *F16B 2/22* (2013.01); *A01K 97/10* (2013.01); *A47K 10/34* (2013.01); *A63C 11/028* (2013.01); *B65D 41/00* (2013.01)

(58) Field of Classification Search
CPC ................................. F16B 2/22; F16M 13/02
USPC .................................................... 248/229.16
See application file for complete search history.

(56) References Cited

U.S. PATENT DOCUMENTS

| | | | |
|---|---|---|---|
| 2,051,068 A | 8/1936 | Ayre | |
| 2,278,075 A | 3/1942 | Hecht | |
| 2,339,187 A | 1/1944 | Pain | |
| 2,513,846 A | 7/1950 | Collins | |
| 2,516,311 A | 7/1950 | Ganz | |
| 3,159,281 A | 12/1964 | Hutter | |
| 3,603,551 A * | 9/1971 | Peterson | B25H 3/04 211/70.6 |
| D250,924 S | 1/1979 | Helsm | |
| 4,138,055 A * | 2/1979 | Harrison | B42D 17/00 232/1 C |
| 4,267,995 A * | 5/1981 | McMillan | F16L 3/23 174/153 G |
| 4,644,610 A * | 2/1987 | Fish | A01G 13/04 211/70.6 |
| 6,769,555 B2 * | 8/2004 | Brady | A47F 7/12 211/113 |
| 8,528,171 B2 * | 9/2013 | Walker | B65H 75/362 24/115 A |
| 1,086,200 A1 | 2/2014 | Michie | |
| 2014/0034797 A1 * | 2/2014 | Markwardt | F16M 13/02 248/231.81 |

FOREIGN PATENT DOCUMENTS

| | | |
|---|---|---|
| DE | 20302218 U1 | 7/2004 |
| GB | 388343 | 2/1933 |
| GB | 632400 | 7/1947 |
| GB | 2489277 A | 9/2012 |

* cited by examiner

*Primary Examiner* — Mark Wendell

(57) ABSTRACT

An object holding device featuring multiple tabbed diaphragms in embodiments of the invention solves the lack of a previously existing elegant solution to store cleaning rags, cleaning implements and other flexible objects. The preferred embodiment of the present invention features a housing containing multiple tabbed diaphragms, which in the aggregate, when used as intended by the inventor, apply enough force to an object to hold an object within the tabbed diaphragms. Said embodiment also enables its user to easily remove objects from the plurality of tabbed diaphragms without causing damage to either the object or the tabbed diaphragms.

26 Claims, 9 Drawing Sheets

FLEXIBLE OBJECT HOLDER EMPLOYING THE USE OF A PLURALITY OF DIAPHRAGMS

CROSS-REFERENCE TO RELATED APPLICATIONS

This application claims the benefit of U.S. Provisional Application No. 61/829,600, filed May 31, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

This invention relates generally to a holding device for securing objects, such as towels, rags and other items, which could benefit from enhanced securing and organization. More specifically, the preferred embodiment of the invention incorporates a plurality of diaphragms, each having a plurality of deflectable tabs allowing for displacement of an object through the diaphragms.

BACKGROUND

In many fields of use, the lack of an elegant solution to store cleaning rags, cleaning implements and other flexible objects represents a frequent cause of frustration and inefficient work-practice.

Some devices known in the prior art attempt to solve this problem by utilizing a single diaphragm mechanism with a plurality of deflectable tabs that allow a portion of a flexible object to be inserted between the deflectable tabs. Such an object may also partially insert through the diaphragm. The resiliency of the tabs provides a retaining force that works to secure the object. By pulling axially on the object, said object may be withdrawn from the tabs. However, in such devices, the process of withdrawing such an object from the tabs leads to damage and excessive wear on objects interacting with such devices. When more fragile objects are stored by use of such devices, damage and excessive wear often includes tearing and other un-repairable damage.

A broad need exists to store and then easily remove from storage Non-Structural Flexible objects, such as plastic bags, towels and rags. As used herein, "Non-Structural Flexible" refers to the properties of an object, which can hold infinite forms with no external strain-inducing load applied to said object. This category of object comprises objects such as plastic bags, towels and rags. Workers in a variety of industries often carry Non-Structural Flexible objects. For example, window washers often carry a towel, while mechanics often carry rags. Other non-workers also often have a need to easily store or hold up Non-Structural Flexible objects on a routine basis.

Devices known in the prior art often utilize a single diaphragm mechanism to accomplish this task. Considerations relevant to diaphragm materials utilized dictate that the properties of materials used have characteristics to ensure that such materials remain resilient enough to retain an object while permitting enough deflection of diaphragm tabs without plastic deformation to enable release of said object without damage to either said object or said diaphragm tabs. Objects used in conjunction of such a holder vary in thickness and as such it may be desirable that such a device allow for holding objects having differing thicknesses. However, at least partially because of considerations relevant to the properties of materials used, many devices known in the prior art are limited in the size and thickness of the items such devices may retain.

The use of Non-Structural Flexible objects in conjunction with some existing single diaphragm holding devices known in the prior art poses a number of undesirable problems. Prior art devices typically require the user to partially insert a finger through the diaphragm to insert the object into the device for proper retention. Thus, the user's finger may become entrapped in the object holder. Given the stiff nature of the deflectable tabs, pulling said finger out creates a further constriction until the tabs deflect outward from the device. This results in painful and potentially injurious consequences to a user of such prior art devices.

Furthermore, the single diaphragm approach utilized by devices known in the prior art exhibits problems with Non-Structural Flexible object removal. A variety of Non-Structural Flexible objects, such as paper towels and napkins, have a high degree of fragility. As such, said variety of Non-Structural objects has a particular proclivity to tearing. The force required to deflect diaphragm material in prior art devices utilizing a single diaphragm approach may cause damage a Non-Structural Flexible object inserted within during extraction of said object. Such damage may comprise tearing, stretching, or excessive wear on a Non-Structural Flexible object.

In other applications known in the prior art, holding devices may be utilized in conjunction with the use of Structural Flexible objects to constrain them in an intended configuration comprising a user's belt, desktop, constrained to a wall or mounted to vehicle. As used herein, "Structural Flexible objects" refers to objects which maintain their intended manufactured form when fully supported with no external strain-inducing load but exhibit elastic deformation under strain inducing loads when operating within the range of intended use of the object. This category of object comprises objects such as writing implements, paint brushes, skis and fishing poles. A variety of problems associated with prior art devices designed to hold Non-Structural Flexible objects also similarly apply to prior art devices designed to hold Structural Flexible objects. In particular, generally speaking, prior art devices do not easily enable a user to store multiple Structural Flexible or Non-Structural objects within the same compartment. In other words, prior art devices generally require subdivided compartments to store multiple items, each subdivided compartment having its own single diaphragm. It follows, therefore, that such prior art devices necessarily suffer inefficiencies with regard to use of space and ease of use.

The above applications and other known prior art devices also exhibit problems associated with of the size and thickness of the object they can effectively retain. These limitations occur at least partially due to properties associated with diaphragm material used. Devices known in the prior art utilize diaphragms manufactured from plastic (e.g., polyethylene), which typically exhibits at least a minimum shore D Durometer hardness of 55. As a result, the diaphragm may accept only a limited range of effective diameter objects without plastic deformation caused to the tabs.

SUMMARY

In a flexible object holder employing the use of a plurality of diaphragms embodying principles of the invention, the device avoids the size and weight limitations associated with other known devices. A key feature of a holding device embodying principles of the invention is that it incorporates a plurality of diaphragms with tabs allowing for ease of acceptance and release of Non-Structural Flexible objects.

The use of multiple diaphragms in a device embodying principles of the invention allows for doubling, tripling etc. the number of tabs that engage flexible objects, such as a towel. In this regard, even though the retaining force or resiliency of an individual tab of the softer diaphragm material is less than the retaining force of other known prior art devices exhibiting a singular diaphragm, the increased number of tabs engaging an object allows the holding device to securely retain objects of varying effective diameter, weights and flexibility. The use of multiple diaphragms also allows for the storage of multiple objects within the same compartment in an embodiment of the invention. Such a configuration enables a more efficient usage of space associated with the design of the preferred embodiment of the invention. Further, the ability to store multiple Structural Flexible objects, as in the preferred embodiment of the invention, within the same compartment allows for a greater ease of use. A device embodying principles of the invention solves a variety of problems by the use of a plurality of diaphragms. The plurality of diaphragms allows for the use of softer diaphragm material. This softer diaphragm material permits greater tab displacement. The greater tab displacement allows a device embodying principles of the invention to accommodate objects with larger effective diameter. The greater tab displacement also permits the distal ends of the tabs to meet or nearly meet each other in order to engage objects with smaller effective diameter.

Moreover, a device embodying principles of the invention allows for the holding of fragile items without tearing or causing damage to fragile objects held by the device. Unlike holding devices known in the prior art, which incorporate a singular diaphragm and incorporate a harder diaphragm material, the preferred embodiment of the present invention utilizes multiple diaphragms constructed of softer material. The multiple diaphragms multiply the strength of a holding device embodying principles of the invention. By incorporating softer material in each diaphragm, however, the device embodying principles of the invention enables the storage of more fragile flexible items, while minimizing the risk of tearing or wear on the flexible objects held up by the said device.

DETAILED DESCRIPTION

Figure 1:
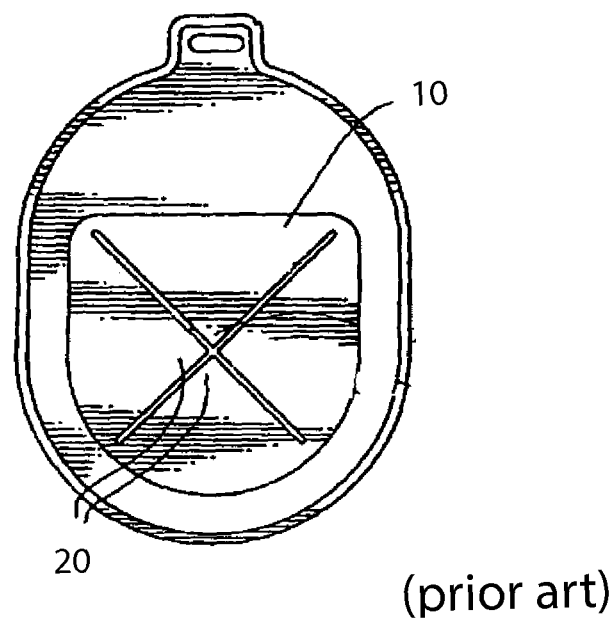
FIG. 1 shows a prior art holding device.

The preferred embodiment of the invention incorporates multiple diaphragms designed to hold a Non-Structural Flexible object 170 or Structural Flexible object 310, 320, 330 or a plurality of Non-Structural Flexible or Structural Flexible objects. It will be appreciated that a device incorporating embodiments of the invention may retain towels, paper towels, fabrics, plastics, or a variety of other Non-Structural Flexible objects. It will also be appreciated that a device incorporating embodiments of the invention may retain toothbrushes 310, skis 320, screwdrivers 330, ink pens, paint brushes, or a variety of other Structural Flexible objects.

Reference will now be made to the accompanying drawings, which at least assist in illustrating various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 3:
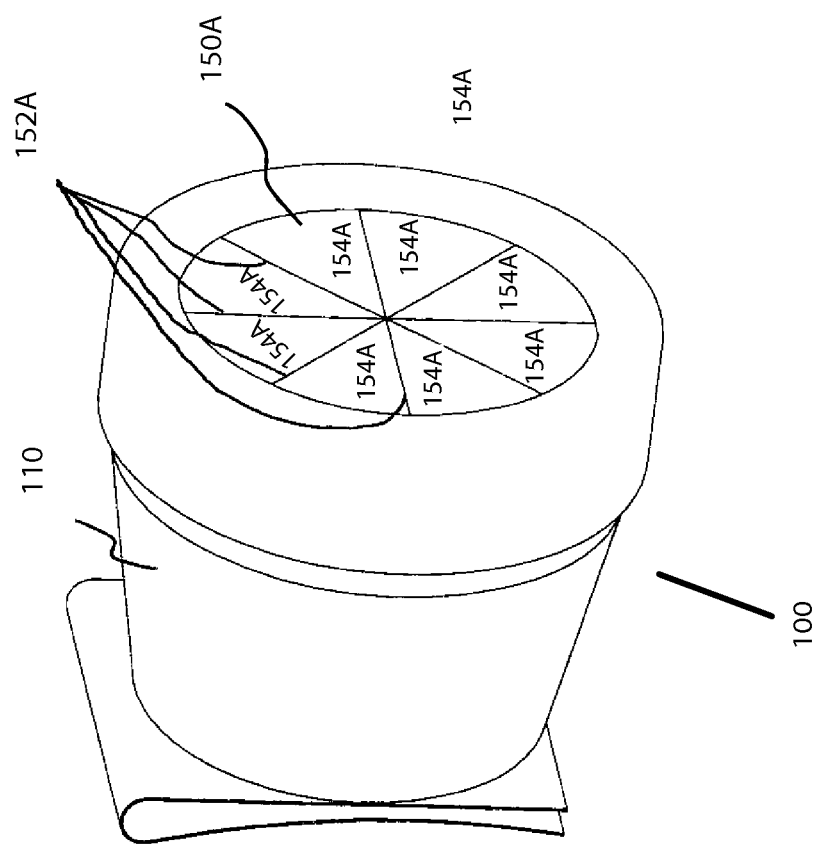
FIG. 3 shows a perspective view of an embodiment of the presented holding device.
Figure 4:
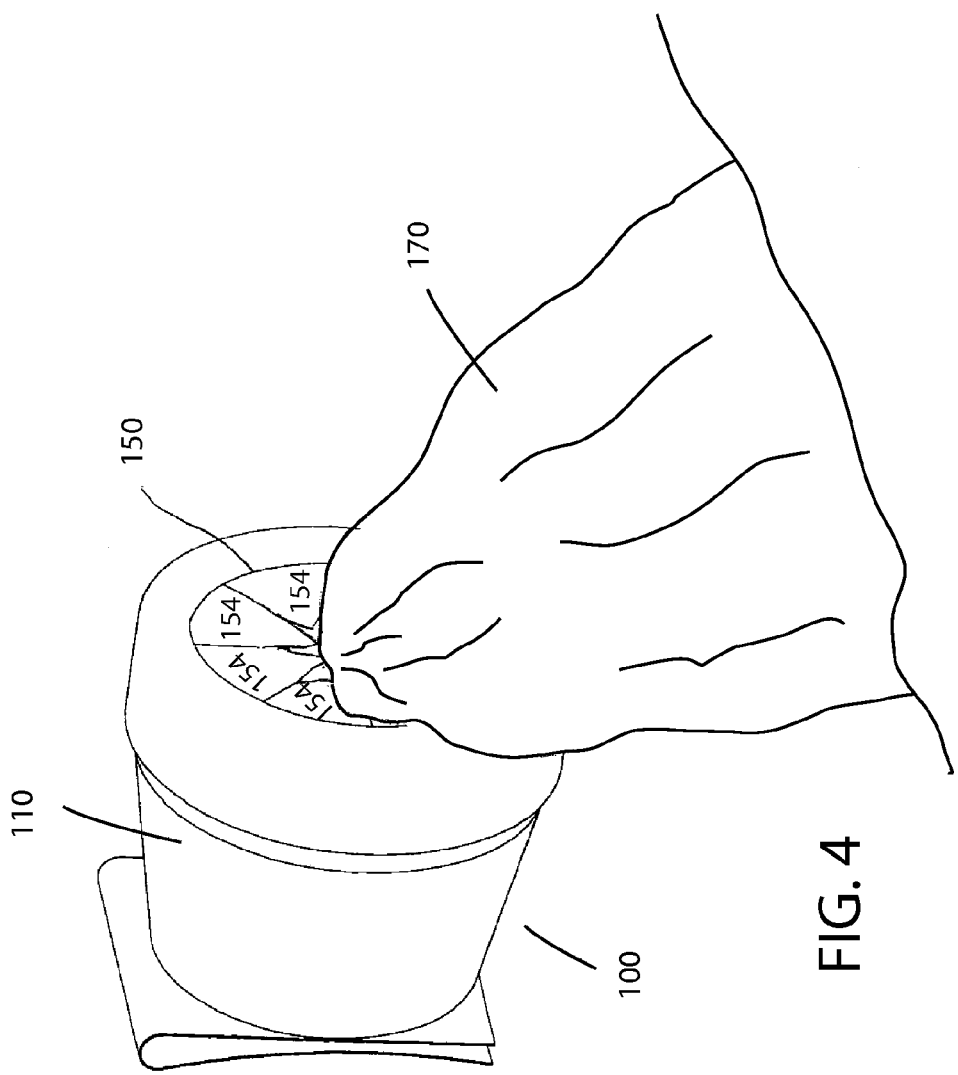
FIG. 4 shows a perspective view of an embodiment of the holding device of FIG. 3 holding a Flexible Non-Structural object.
Figure 5:
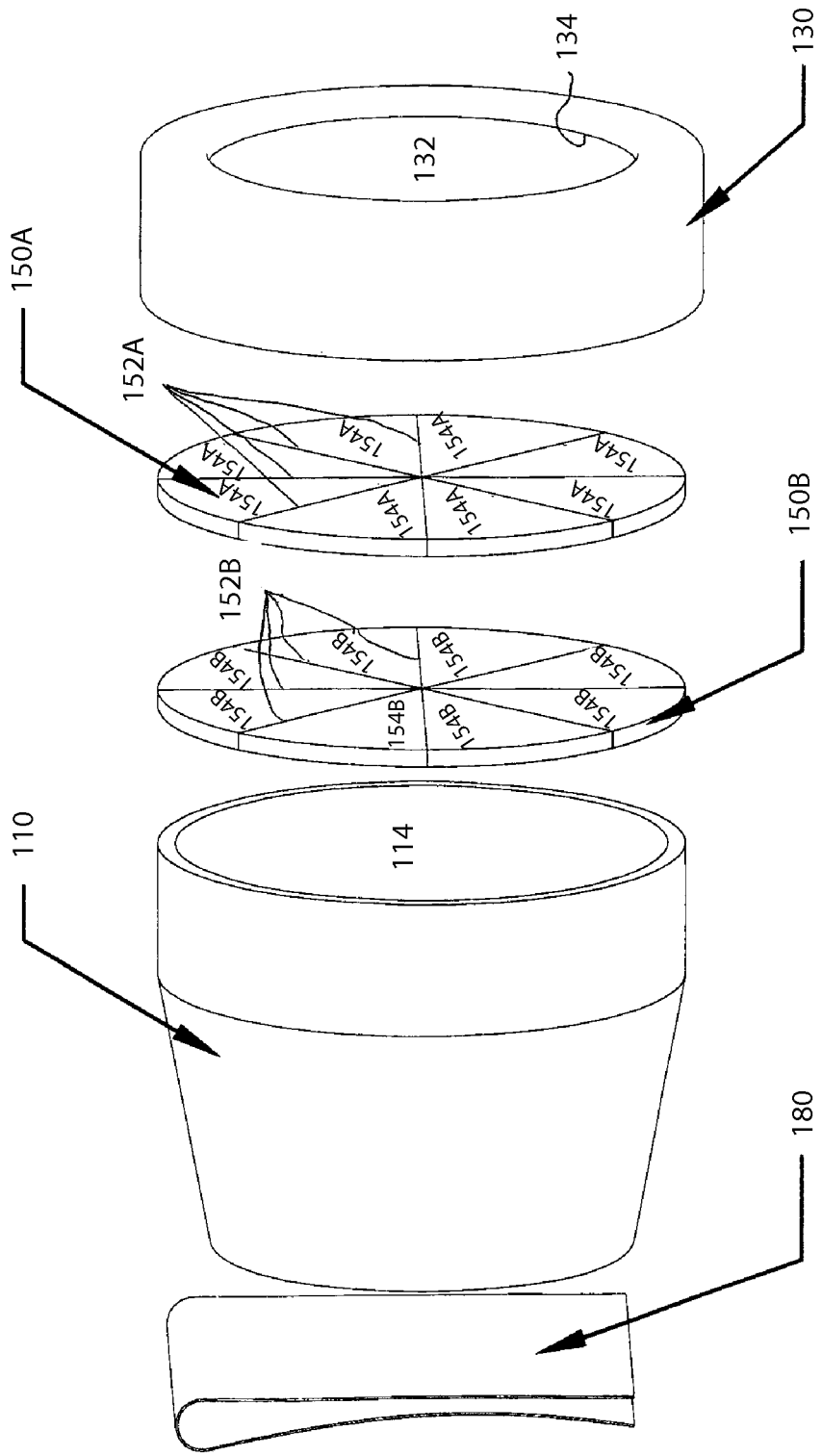
FIG. 5 shows an exploded view of an embodiment of the presented holding device.
Figure 6:
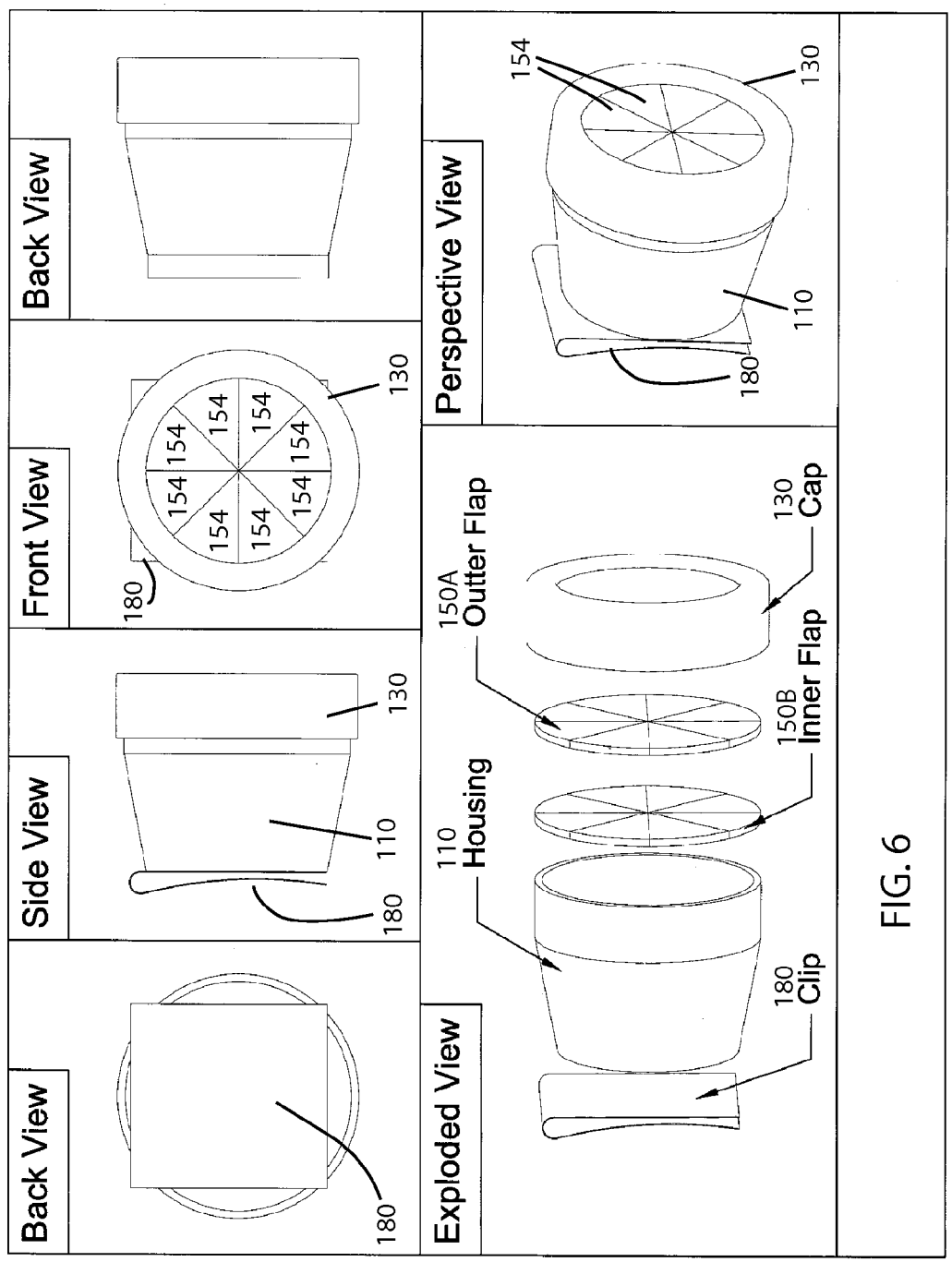
FIG. 6 shows further views of an embodiment of the holding device.
Figure 7:
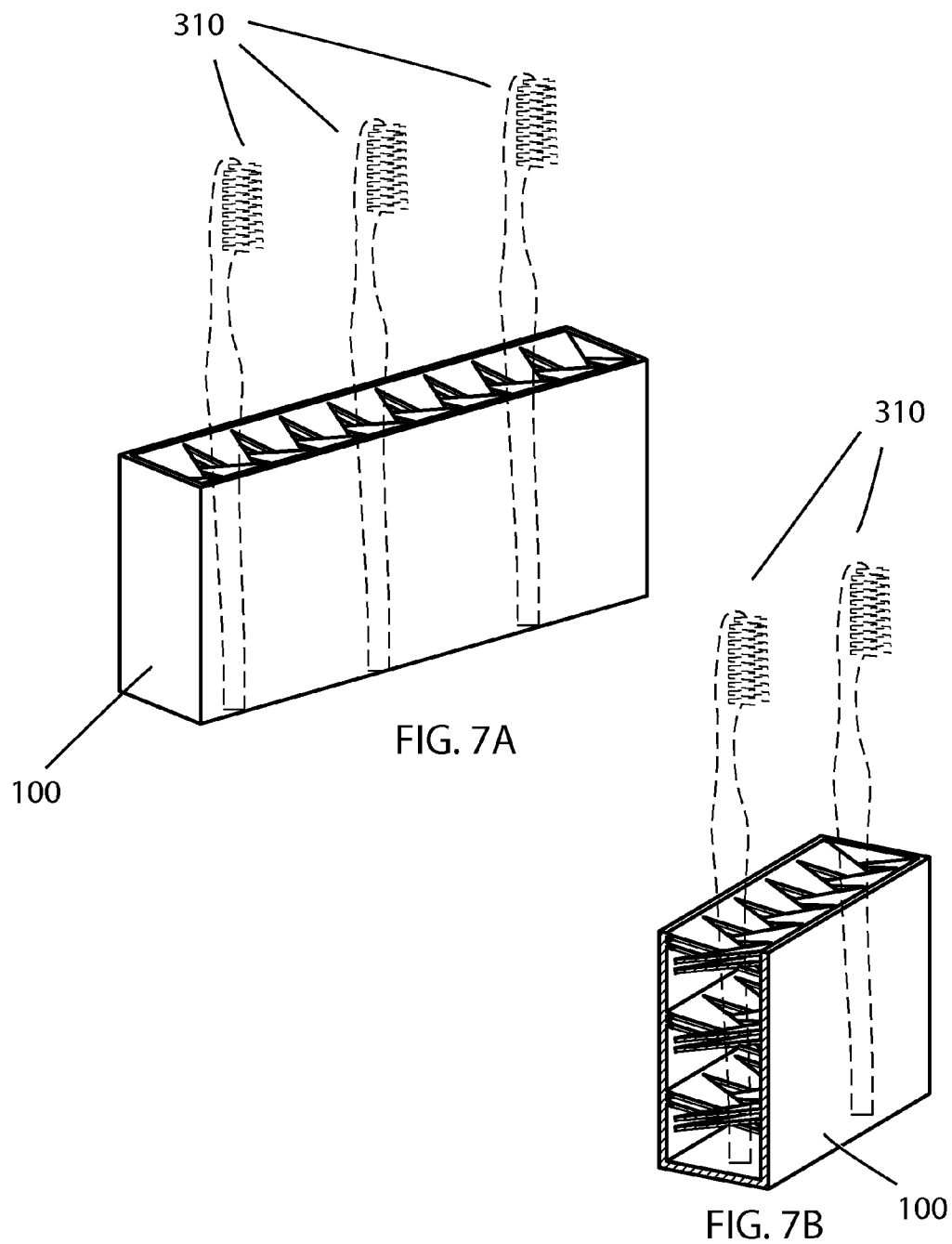
FIG. 7A shows an angular view of an embodiment incorporating principles of the invention holding a plurality of Flexible Structural objects, in this example, brushes.
FIG. 7B shows an angular sectional view of an embodiment incorporating principles of the invention holding a plurality of Flexible Structural objects, in this example, brushes.

FIGS. 3, 4 and 5 illustrate one embodiment of an object holding device 100 in accordance with certain aspects of the presented invention. As shown, the device 100 includes a recessed housing 110 that supports at least a first and second membranes or diaphragms 150 over its open end. The diaphragms 150A, 150B each includes a plurality of slits 152A, 152B that extend there through. Furthermore the individual diaphragms as presented may embody a contiguous membrane or a plurality of individual geometrically shaped tabs to comprise a full diaphragm.

These slits define first and second sets pluralities of deflectable tabs 154A, 154B. As shown, each of the slits 152 intersect at a center of its respective diaphragm 150. However, this is not a requirement. Referring to FIG. 5, it is noted that illustrated holding device 100 utilizes first and second diaphragms 150A, 150B. However, it will be appreciated that other embodiments of the presented holding device 100 may utilize additional diaphragms. That is, other embodiments may utilize three, four, five or more diaphragms.

In use, in a device embodying principles of the invention, a user may displace a Non-Structural Flexible object such as a towel or rag 170 through the diaphragms 150A, 150B. See FIG. 4. A user may do so by pressing a finger through the diaphragms 150A, 150B, a user may press the object between their finger and the diaphragms past the first and second sets of deflectable tabs 154A, 154B and into the interior 114 of the housing 110. It will be appreciated that the design of the device 100 allows a user to grasp the housing and insert a Non-Structural Flexible object 170 through the diaphragm using a single hand.

As the Non-Structural Flexible object 170 passes through a diaphragm in a device embodying principles of the invention, the tabs 154A, 154B flex such that they are pushed inward into the recessed surface 114 of the housing 110. Distal portions of at least a portion of the tabs engage the flexible object and work to maintain the Non-Structural Flexible object 170 within the device. That is, the resiliency of the tabs 154A and 154B when used in conjunction as in the preferred embodiment of the invention provide a retaining force that securely holds the Non-Structural Flexible object 170 within the holding device 100. However, when a user pulls an object outward, the tabs will release the Non-Structural Flexible object 170. In a preferred embodiment of the invention, a user would need to apply only a minimal pulling force to the object to cause said tabs to release said Non-Structural Flexible object 170.

Figure 8:
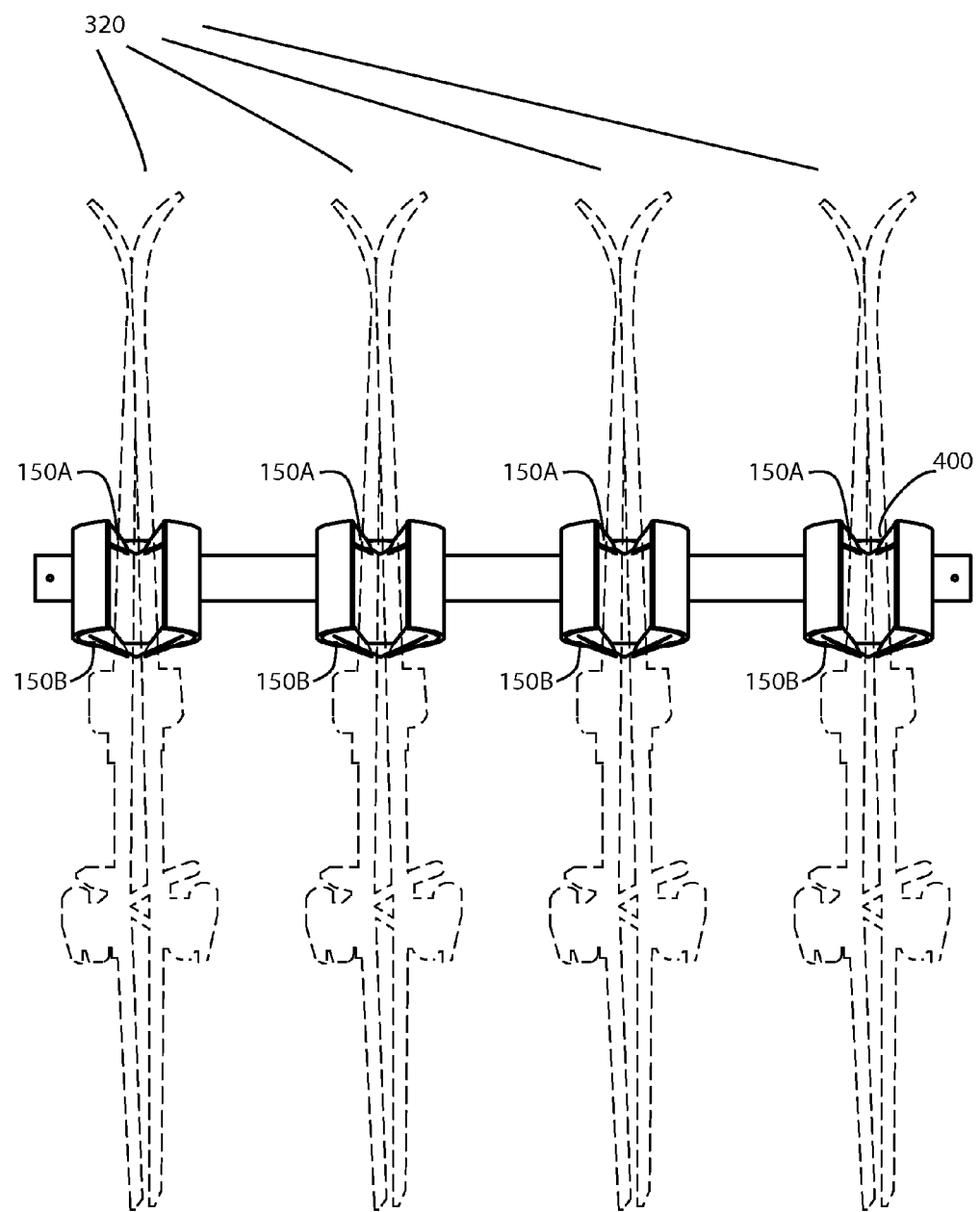
FIG. 8 shows an view of an alternative embodiment incorporating principles of the invention designed to be attached to a wall holding a plurality of Flexible Structural objects, in this example, skis.
Figures 9A, 9B:
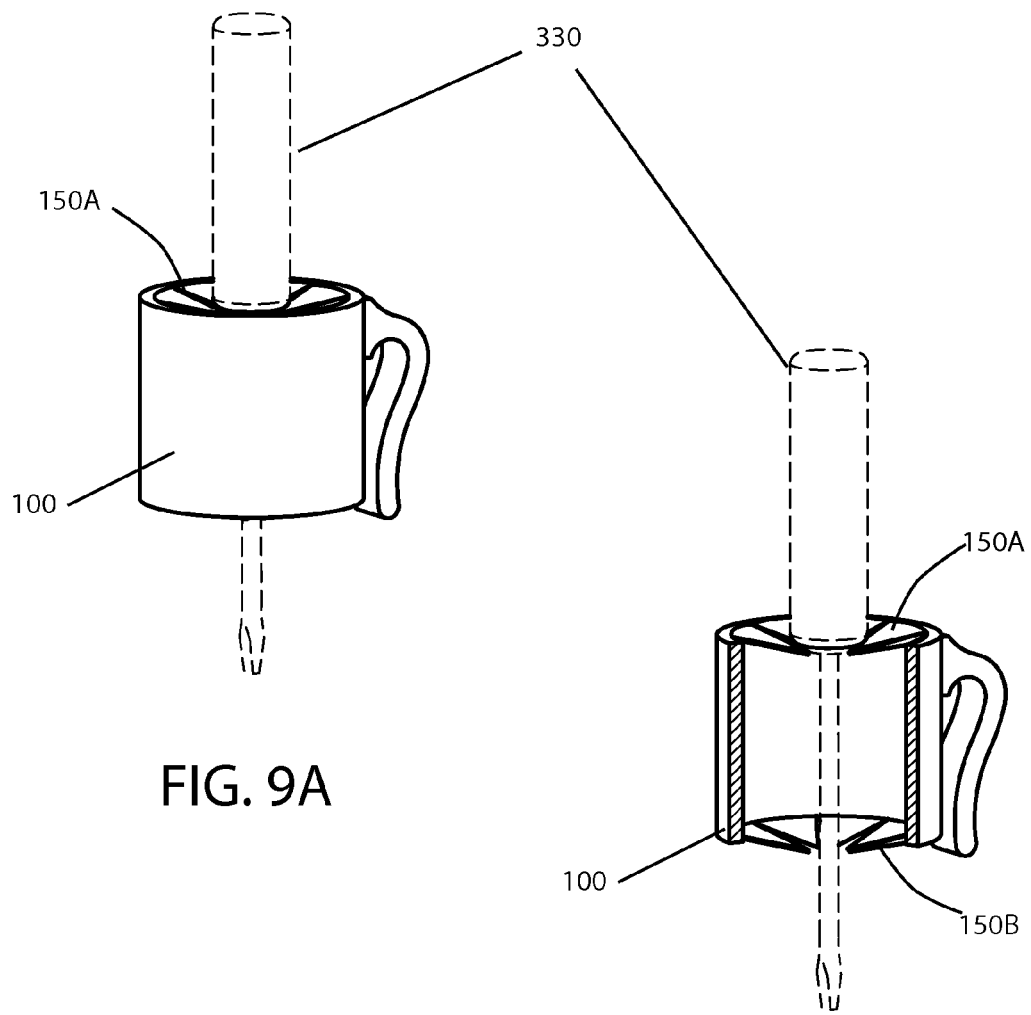
FIG. 9A shows an view of an alternative embodiment incorporating principles of the invention holding a singular Flexible Structural object, in this example, a screwdriver.
FIG. 9B shows a sectional view of an embodiment incorporating principles of the invention holding a singular Flexible Structural object, in this example, a screwdriver.

Furthermore, a user may displace a plurality of Structural Flexible objects such as skis 320 through the diaphragms 150A, 150B. See FIG. 8. Alternatively and similarly, a user may displace a singular Structural Flexible object such as a screwdriver 330 through the diaphragms 150A, 150B. See FIGS. 9A and 9B. That is, by grasping the object 330 by one end and pressing the opposite end through diaphragms 150A, 150B, a user may press the object past the first and second sets of deflectable tabs 154A, 154B and into the interior 114 of the housing 110. It will be appreciated that in the preferred embodiment of the invention the varying designs of the device 100 allow a user to insert the Structural Flexible object 310, 320, 330 through the diaphragm using a single hand.

As the Structural Flexible object 310, 320, 330 passes through the diaphragm, the tabs 154A, 154B flex such that they are pushed inward into the recessed surface 114 of the housing 110. Distal portions of at least a portion of the tabs engage the flexible object and work to maintain the object within the device. That is, the resiliency of the tabs 154A, 154B provides a retaining force that securely holds the Structural Flexible object 310, 320, 330 within the holding device 100. However, by applying a sufficient pulling force, the tabs will release the flexible object 310, 320, 330.

It has been recognized that utilization of multiple diaphragms allows for providing adequate retention force for maintaining an object within the holding device while allowing the use of softer materials to form the diaphragms. In this regard, softer diaphragms allow the device to hold objects with very small effective diameters as well as objects exhibiting larger effective diameters.

The present inventor has discovered that devices known in the prior art are limited with regard to the size and thickness of objects that such devices can retain. These limitations occur at least partially due to properties associated with materials utilized in the construction of the diaphragm. Examples of limitations associated with prior art devices include the following. To hold objects with small effective diameter, the tabs 20 of such a diaphragm 10 may need to meet nearly in the center of the diaphragm. See FIG. 1. The close spacing of the distal ends of such tabs 20 limits the thickness of objects that may be displaced through the diaphragm. Use of a softer diaphragm material permits displacement of a thicker object through such a diaphragm but results in a reduced retention force applied by each tab. As used herein, "effective diameter" refers to the measurement across the widest portion of the object as inserted into the device, whereas in the preferred embodiment of the invention a Structural Flexible object 310, 320, 330, maintains a consistent effective diameter and that of a Non-Structural Flexible object 170 will depend upon the configuration and portion of the object which is inserted into the device.

The preferred embodiment of the invention addresses problems associated with size and thickness constraints associated with prior art devices. That is, rather than utilizing a stiffer plastic diaphragm, the diaphragms in a device incorporating embodiments of the invention are typically comprised of an elastomeric material that is considerably more pliable than most plastics. In this regard, it has been found by the inventor that materials having a Shore A Durometer hardness of less than 90 provide a suitable diaphragm for the device 100.

Figure 2:
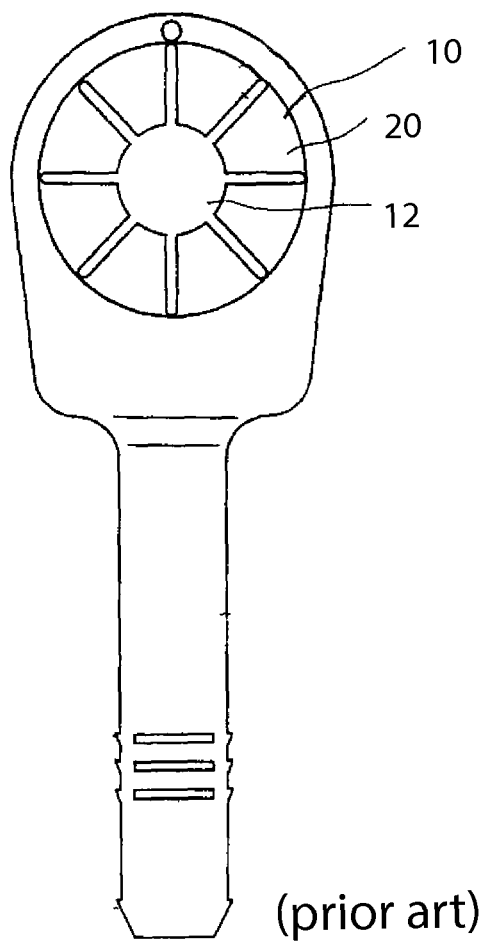
FIG. 2 shows a prior art holding device.

Accordingly, use of lower Durometer materials, such as Shore A Durometer 90 and lower in a single diaphragm configuration can result in failure to retain Non-Structural Flexible objects 170 or Structural Flexible objects 310, 320, 330 within the holding device. Therefore, to hold thicker Non-Structural Flexible objects 170 or Structural Flexible objects 310, 320, 330, holding devices typically utilize tabs 20 that are spaced from the center of the diaphragm 10. See FIG. 2. That is, the center of the diaphragm may include an aperture 12 and the tabs 20 extend around the periphery of this central aperture 12. As will be appreciated, if a holder incorporates a central aperture, it cannot hold Non-Structural Flexible objects 170 or Structural Flexible objects 310, 320, 330 exhibiting a smaller effective diameter without design changes.

More specifically, materials having a Shore A durometer hardness of less than 90, more preferably less than 80 and yet more preferably less than about 70 provide diaphragms that allow deflection that is adequate to permit insertion of thick Non-Structural Flexible objects 1 while also permitting the engagement of thin Non-Structural Flexible objects. In one particular embodiment, the device utilizes neoprene rubber diaphragms having a thickness of approximately 1/16 of an inch. In contrast, most plastics (e.g., polyethylene, polypropylene etc.) have a Durometer hardness considerably in excess of the claimed range. That is, many plastics are too hard to be measured utilizing the Shore A Durometer scale. For instance, most plastics have a minimum Shore D Durometer hardness of 55, which equates to a hardness that is greater than the maximum measure of Shore A Durometer hardness.

The use of the multiple diaphragms allows for providing sufficient retention force to maintain a thicker and/or heavier Non-Structural Flexible object within the device. That is, even though each tab of the softer diaphragm material has a reduced resiliency, the increased number of tabs provided by the multiple diaphragms results in a holding device having sufficient retention force for thicker towels and other Non-Structural Flexible objects. Further, the use of a softer diaphragm material reduces the potential of painful or injurious results to a user's finger that is inserted into the device. That is, prior art devices having hard plastic tabs can result in a situation where a user pushes their finger through the stiffer tabs, which pinch the finger upon removal. Utilization of the more easily deflectable tabs prevents such inconvenience for the user. That is, the pliability of the tab material permits removal of a user's finger without risk of injurious or painful use.

As shown in FIG. 5, the first and second diaphragms 150A, 150B are disposed adjacent to one another (e.g., stacked) and each have a periphery that engages a rim surface 112 of the housing 100. In this regard, the diaphragms 150A, 150B each extend over the open end of the housing 110. Stated otherwise, the diaphragms extend over the recessed inside surface 114 of the housing 110 such that they may deflect inward upon a Non-Structural Flexible object being displaced through the center portions of the diaphragms.

The peripheries of the diaphragms 150A, 150B are compressed against the rim 112 of the housing 110 by a retaining ring 130. As shown, the retaining ring 130 is an annular element having a central aperture 132 that is disposed over the central portion of the diaphragms when the device is assembled. See FIG. 3. The retaining ring 130 has an inner lip 134 that is smaller than the inside diameter/cross-dimension of the rim 112 of the housing 110. Accordingly, when the retaining ring 130 is disposed onto the housing 110 the peripheries membranes 150A, 150B are compressed between the inner lip 134 and the rim 112 of the housing and thereby secured in place. A sidewall portion of the retaining ring 130 connects to an outside surface of the housing 110. The retaining ring may be connected to the housing via a friction fit, adhesives or other fasteners.

In the present embodiment, the housing 100 is formed of generally circular cup having a closed bottom end. However, it will be appreciated that differently configured housings may be utilized. For instance, the housing may comprise any frame that allows for supporting the peripheries of multiple diaphragms such that tabs of the diaphragms may be deflected. Further, the housing need not be circular or annular nor does it need to exhibit a contiguous perimeter. In this regard, will be appreciated that various different geometric shapes, open and closed may be utilized. What is important is that the housing provide a frame that has an open aperture over which multiple diaphragms may be disposed.

As shown in the preferred embodiment, the diaphragms 150A and 150B are disposed adjacent (e.g., stacked) to each other. However, it will be appreciated that said diaphragms are not required to be stacked and may exhibit spacing between diaphragms. It will be further appreciated that in a configuration exhibiting a plurality of diaphragms in excess of two, the diaphragms need not exhibit equidistant spacing.

As shown in the preferred embodiment, the tabs 154 are formed such of their distal ends each meet at the center of their respective diaphragms 150. However, it will be appreciated that other embodiments may be otherwise configured. For instance, each diaphragm may include a central aperture around which each of the slits radially extend from to define multiple tabs. However, it may be desirable that the distal tips of the tabs meet such that small Non-Structural Flexible objects may be held by the device.

In an embodiment of the invention, the embodiment further includes a clip 180 that allows the housing 110 to be connected to, for example, a user's belt. However, it will be appreciated that the housing 110 may also be secured to a supporting structure (e.g., wall) utilizing fasteners such as screws that extends through a bottom surface of the housing 110.

This problem also extends to the use of Flexible Structural objects. For instance, a single diaphragm prior holder intended to hold a pen of diameter 0.5" exhibiting a design of tabs 20 spaced from the center of the diaphragm creating an aperture 12 of size 0.3" is not able to securely retain an artist's paintbrush with diameter 0.125"

Further embodiments of the invention may exhibit a geometrically shaped housing with open top and bottom ends allowing for insertion and retention of elongated objects such as skis 320 (See FIG. 8) or broomsticks. The preferred embodiment employs the use of a plurality of diaphragms allowing for the elongated objects to be inserted roughly half the length of the object and may be used for vertical storage of elongated objects. Furthermore, other embodiments may exhibit an open perimeter 400 allowing for lateral insertion and engagement of the diaphragms and object multiples of the embodiment may be used in conjunction to allow for secure lateral object retention mounted to mobile or static structures.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described herein-above are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "coupled" and "linked" as used herein is defined as connected, although not necessarily directly and not necessarily mechanically. A device or structure that is "configured" in a certain way is configured in at least that way, but may also be configured in ways that are not listed.

Also, the sequence of steps in a flow diagram or elements in the claims, even when preceded by a letter does not imply or require that sequence.

I claim:

1. A device for holding flexible objects, comprising:
a frame further comprising a rim;
a diaphragm stack further comprising:
   a first diaphragm disposed over at least a portion of an aperture defined by said rim, said first diaphragm having a first plurality of intersecting slits comprising at least first and second slits extending through the thickness of said first diaphragm and outward toward the periphery of the first diaphragm, defining a first plurality of separable tabs in said first diaphragm, said first tabs being located on a first radial plane in their rest state, and said first tabs having deflectable distal ends located near the center of the first diaphragm; and
   a second diaphragm, wherein:
      said second diaphragm comprises a second plurality of intersecting slits having at least first and second slits extending through the thickness of the second diaphragm and outward toward the periphery of the second diaphragm, defining a second plurality of separable flexible tabs in said second diaphragm, said second tabs being located on a second radial plane parallel to the first radial plane in their rest state, and said first tabs having deflectable distal ends located near the center of the second diaphragm;
      said second diaphragm is adjacent to said first diaphragm on the side of the first diaphragm that is opposite of the rim;
      said second diaphragm is in direct contact with said first diaphragm; and
      the deflectable distal ends of said first tabs are configured to deflect in response to direct contact and deflection of the deflectable distal ends of said second tabs;
the aperture, the first diaphragm, and the second diaphragm comprise circular shapes having a common central axis that runs through the diaphragm stack in a direction perpendicular to the first radial plane and the second radial plane;
the device is configured for holding a non-structural flexible object that is partially inserted through the common central axis at the center of the diaphragm stack; and
the flexible object comprises a non-structural flexible material selected from the group of plastic sheet, paper, and fabric wherein:
   said flexible material can hold an infinite set of forms with no strain-inducing load applied to the flexible material; and
   said device is configured for retaining the flexible material in the first tabs and the second tabs.

2. The device of claim 1, wherein:
the diaphragm stack further comprises a flexible third diaphragm, wherein:
   said third diaphragm comprises a third plurality of intersecting slits having at least first and second slits extending through the thickness of said third diaphragm outward toward the periphery of the third diaphragm to define a third plurality of separable tabs in said third diaphragm, said third tabs being located on a third radial plane parallel to the first radial plane and the second radial plane in their rest state, and said first tabs having deflectable distal ends located near the center of the third diaphragm;
   said third diaphragm is adjacent to said second diaphragm on the side of the second diaphragm that is opposite the first diaphragm;
   said third diaphragm is in direct contact with said second diaphragm; and
   said second tabs are configured to deflect in response to direct contact and deflection of said third tabs;
the first slit in the first diaphragm, the first slit in the second diaphragm, and the first slit in the third diaphragm are aligned on a first axial plane; and
the second slit in the first diaphragm, the second slit in the second diaphragm, and the second slit on in the third diaphragm are aligned on a second axial plane that intersects the first axial plane at the common central axis of the diaphragm stack;
the first diaphragm is contiguous wherein the first plurality of slits extend partially to the periphery of the first diaphragm;
the second diaphragm is contiguous wherein the second plurality of slits extend partially to the periphery of the second diaphragm;
the third diaphragm is contiguous wherein the third plurality of slits extend partially to the periphery of the third diaphragm;
the first tabs, the second tabs, and the third tabs have pointed shapes at their deflectable distal ends;
the non-structural flexible object is further selected from the group of a plastic bag, a napkin, a towel, and a rag; and
the device is configured so a user can press the non-structural flexible object through the centers of the third diaphragm, the second diaphragm, and the first diaphragm using a digit on a hand to engage the non-structural flexible object with the pointed shapes at the deflectable distal ends of the first tabs, second tabs, and third tabs.

3. The device of claim 2, wherein:
the diaphragm stack further comprises one or more additional flexible diaphragms, wherein:
   said additional diaphragms comprise at least an additional plurality of first and second slits extending through the thickness of the additional diaphragms outward toward said rim to define an additional plurality of separable tabs in said additional diaphragms, said additional tabs being located on an additional radial plane parallel to the first radial plane, the second radial plane, and the third radial plane in their rest state, and said additional tabs having deflectable distal ends located near the centers of the additional diaphragms;
   said additional diaphragms are adjacent to said third diaphragm on the side of the third diaphragm that is opposite of the second diaphragm;
   said additional diaphragms are in direct contact with said third diaphragm; and
   the deflectable distal ends of said third tabs are configured to deflect in direct response to deflection of the deflectable distal ends of said additional tabs;
the slits in the additional diaphragms have their intersection on the common central axis;
the device further comprises a retaining ring wherein:
   the retaining ring is an annular element having a retaining ring aperture;
   the retaining ring is adjacent to diaphragm stack and located on the side of the diaphragm stack that is opposite of the rim;

the center of the retaining ring aperture is co-axial with the common central axis;
the peripheries of the diaphragms in the diaphragm stack are compressed between the rim and the retaining ring; and
the retaining ring is secured to the rim using a friction fit;
the frame further comprises a housing in the shape of a recessed cup with a closed end and an open end;
the diaphragm stack is located on the open end of the cup;
the device further comprises a clip wherein:
the clip is located near the closed end of the housing; and
the clip is configured for attachment to a user's belt.

4. The device of claim 1, wherein:
said first and second slits of said first and second diaphragms align, wherein the distal ends of the tabs defined by the first and second slits meet at the point of intersection; and
the device further comprises a retaining ring wherein:
the retaining ring is an annular element having a retaining ring aperture;
the retaining ring is adjacent to diaphragm stack and located on the side of the diaphragm stack that is opposite of the rim;
the center of the retaining ring aperture is co-axial with the common central axis; and
the peripheries of the diaphragms in the diaphragm stack are compressed between the rim and the retaining ring.

5. The device of claim 1, wherein:
at least one of said first and second diaphragms further includes an aperture herein referred to as a diaphragm aperture, wherein said plurality of slits extend radially outward from said diaphragm aperture;
the rim comprises a lip that fits around the diaphragm stack;
the device further comprises a retaining ring wherein:
the retaining ring is an annular element having a retaining ring aperture;
the retaining ring is adjacent to diaphragm stack and located on the side of the diaphragm stack that is opposite of the rim;
the center of the retaining ring aperture is co-axial with the common central axis;
the peripheries of the diaphragms in the diaphragm stack are compressed between the rim and the retaining ring;
the retaining ring fits inside the lip; and
the retaining ring is attached to the lip.

6. The device of claim 1, wherein:
said first and second slits in said first and second diaphragms are aligned, wherein:
the first slit in the first diaphragm and first slit in the second diaphragm are aligned on a first axial plane; and
the second slit in the first diaphragm and the second slit on in the second diaphragm are aligned on a second axial plane that intersects the first axial plane at the common central axis of the diaphragm stack;
the first tabs and the second tabs have pointed shapes at their deflectable distal ends;
the non-structural flexible object is further selected from the group of a plastic bag, a napkin, a towel, and a rag; and
the device is configured so a user can press the non-structural flexible object through the centers of the second diaphragm, and the first diaphragm using a digit on a hand to engage the non-structural flexible object with the pointed shapes at the deflectable distal ends of the first tabs and the second tabs.

7. The device of claim 1, wherein:
the first tabs and the second tabs have pointed shapes at their deflectable distal ends;
the pointed shapes on the first tabs and the pointed shapes on the second tabs are rotated relative to one another wherein the slits in the first diaphragm align with the tips of the second tabs that are located in the second diaphragm.

8. The device of claim 1, wherein:
said frame comprises an annular housing, wherein said rim forms an open end of said annular housing; and
the diaphragm stack is located at the open end of the housing.

9. The device of claim 8, wherein:
said annular housing comprises a cup having a closed end opposite said open end.

10. The device of claim 8 wherein:
a depth of said annular housing has a depth that is at least half of a minimum cross-dimension of the aperture defined by the rim; and
the diaphragm stack further comprises a flexible third diaphragm, wherein:
said third diaphragm comprises a plurality of intersecting slits having at least first and second slits extending through the thickness of said third diaphragm outward toward said rim to define a third plurality of separable tabs in said third diaphragm, said third tabs having deflectable distal ends located near the center of the third diaphragm;
said third diaphragm is adjacent to said second diaphragm on the side of the second diaphragm that is opposite of the first diaphragm;
said third diaphragm is in direct contact with said second diaphragm; and
said second tabs are configured to deflect in response to direct contact and deflection of said third tabs; and
the slits in the third diaphragm are configured to have their intersections on the common central axis.

11. The device of claim 8 wherein:
the annular housing comprises a recessed surface; and
a depth of said recessed surface is at least equal to a minimum cross-dimension of the aperture defined by the rim.

12. The device of claim 8, further comprising:
a retaining ring, wherein peripheries of said diaphragms are disposed between said retaining ring and said rim.

13. The device of claim 12 wherein:
said retaining ring connects to an outside surface of said annular housing using an adhesive.

14. The device of claim 12 wherein:
said retaining ring is linked to an inside surface of said annular housing using a friction fit between the retaining ring and the structural housing.

15. The device of claim 1, further comprising:
a clip attached to said frame, wherein said clip allows selective attachment of said frame to a supporting object.

16. The clip of claim 15 wherein:
said clip is comprised of a polymer.

17. The device of claim 1, wherein:
said diaphragms comprise a material having a Shore A Durometer hardness of less than 90; and
the non-structural flexible object comprises a plastic bag.

18. The device of claim 1, wherein:
said diaphragms comprise a material having a Shore A Durometer hardness of less than 70; and
the non-structural flexible object comprises a cloth napkin.

19. The device of claim 1, wherein:
said first and second diaphragms exhibit different material properties; and
the non-structural flexible object comprises a paper napkin.

20. The device of claim 1, wherein:
at least one of said first and second diaphragms comprises an elastomeric material; and
the non-structural flexible object comprises a cloth towel.

21. The device of claim 1, wherein:
at least one of said first and second diaphragms has a thickness of at least 1/16th of an inch; and
the non-structural flexible object comprises a paper towel.

22. The device of claim 1, wherein:
at least one of said first and second diaphragms comprises a rubberized material; and
the non-structural flexible object comprises a rag.

23. The device of claim 1, wherein:
at least one of said first and second diaphragms comprises a neoprene rubber; and
the non-structural flexible object comprises a fabric.

24. The device of claim 1, wherein:
said first and second slits of at least one of said first and second diaphragms align, wherein the distal ends of the tabs defined by said first and second slits meet at the point of intersection;
said first and second slits in said first and second diaphragms are aligned, wherein said pluralities of tabs of said first and second diaphragms are commonly configured;
said frame comprises an annular housing, wherein said rim forms an open end of said annular housing;
said annular housing further comprises a closed end opposite to said open end;
a depth of said recessed surface is at least equal to a minimum cross-dimension of the aperture defined by the rim;
said device further comprising a retaining ring, wherein peripheries of said diaphragms are disposed between said retaining ring and said rim, wherein said tabs of said diaphragms are disposed within an annulus of said retaining ring;
said retaining ring connects to an outside surface of said annular housing;
said device further comprising, a clip attached to said frame, wherein said clip allows selective attachment of said frame to a supporting object;
said clip is comprised of metal, organic polymer, inorganic polymer or other Structural Flexible materials:
said diaphragms comprise a material having a Shore A Durometer hardness of less than about 70;
said first and second diaphragms comprises an elastomeric material; and
at least one of said first and second diaphragms has a thickness of at least $1/16^{th}$ of an inch.

25. A method for holding a flexible object, comprising:
establishing a flexible object wherein establishing further comprises an item selected from the group of a plastic bag, a napkin, a towel, and a rag;
placing a first membrane directly adjacent to a second membrane wherein the first membrane is in physical contact with the second membrane;
manually displacing said object through a central region of the first membrane, wherein:
the first membrane comprises a first plurality of tabs defined by two or more slits extending through the thickness of said first membrane; and
displacing said object further comprises shaping at least a portion of the flexible object into a configuration to be manually displaced through the central region of the first membrane; and
manually displacing said shaped portion of said flexible object through a central region of the second membrane wherein:
the second membrane comprises a second plurality of tabs defined by two or more slits extending through the thickness of said second membrane; and
at least a distal end of at least a portion of said first and second plurality of tabs deflect and engage said shaped portion of said flexible object.

26. A method for detachably attaching a supple object to a holder, the method comprising:
retaining a first elastomeric sheet against a second elastomeric sheet;
retaining the first elastomeric sheet and the second elastomeric in the holder; and
attaching the supple object by:
manually and reversibly forming at least a portion of the supple object so that the object is not planar;
placing at least a section of the manually deformed portion through a first set of deflectable tabs located in the first elastomeric sheet;
placing the section through a second set of deflectable tabs located in the second elastomeric sheet; and
placing the section through an aperture of the frame.

* * * * *